Figure 1:
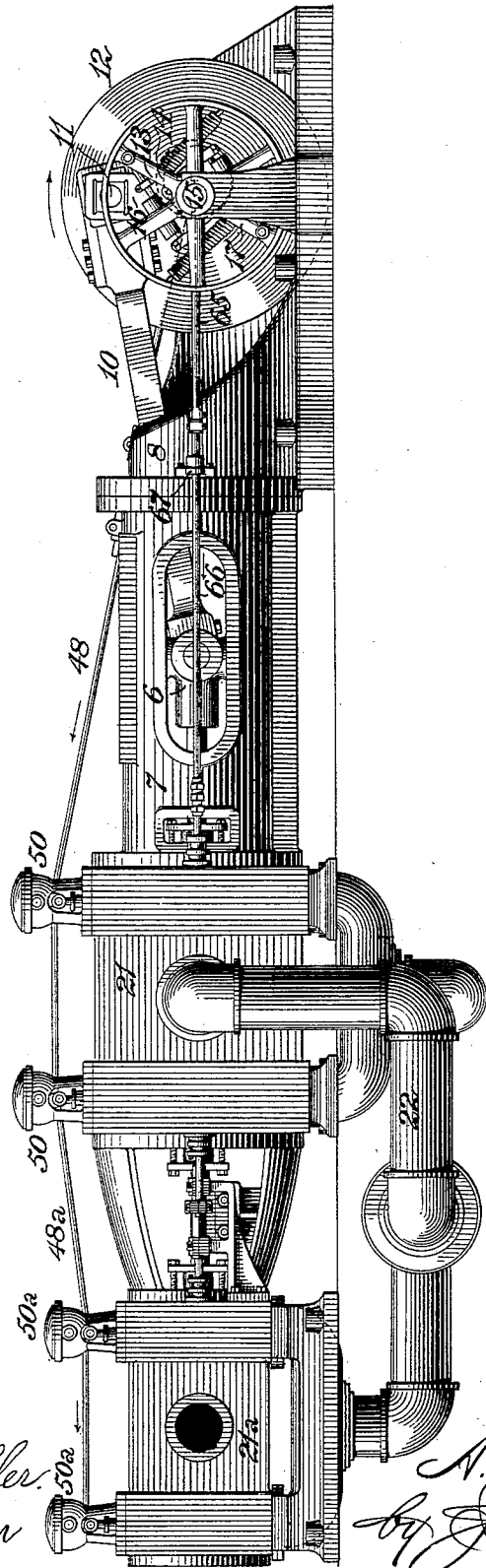

(No Model.)  4 Sheets—Sheet 3.

A. K. MANSFIELD.
STEAM ENGINE.

No. 569,292. Patented Oct. 13, 1896.

WITNESSES:
Chas. F. Miller.
F. E. Gaither

INVENTOR,
A. K. Mansfield
by J. Snowden Bell,
Att'y.

THE NORRIS PETERS CO., PHOTO-LITHO., WASHINGTON, D. C.

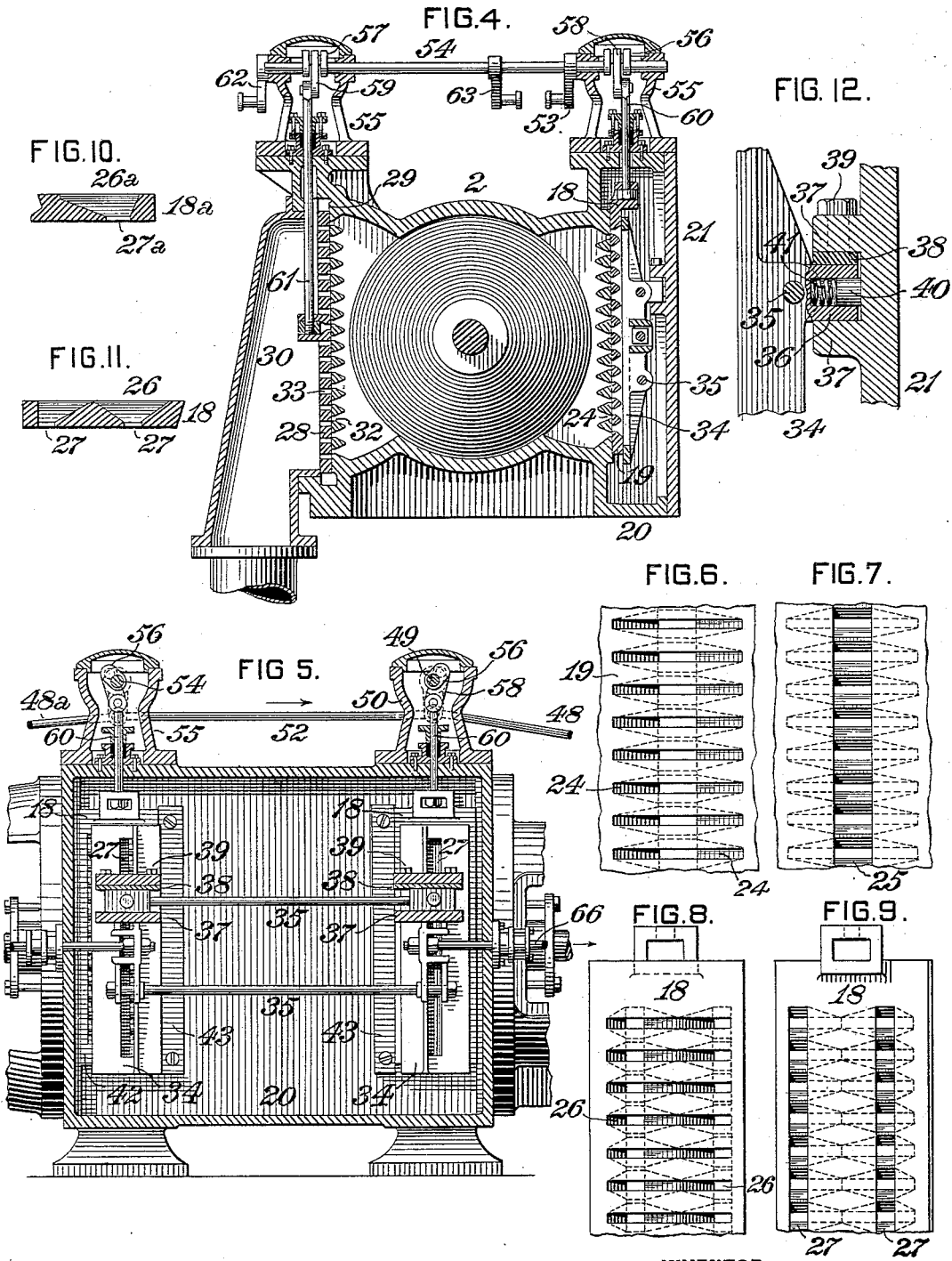

UNITED STATES PATENT OFFICE.

ALBERT K. MANSFIELD, OF SALEM, OHIO.

STEAM-ENGINE.

SPECIFICATION forming part of Letters Patent No. 569,292, dated October 13, 1896.

Application filed December 3, 1895. Serial No. 570,933. (No model.)

*To all whom it may concern:*

Be it known that I, ALBERT K. MANSFIELD, of Salem, in the county of Columbiana and State of Ohio, have invented certain new and useful Improvements in Steam-Engines, of which improvements the following is a specification.

The object of my invention is to provide a construction designed more particularly for application in engines of comparatively large size and power and operating at high piston speed having at each end of the cylinder separate steam and exhaust valves and an independently-operated cut-off valve, said valves and their ports being of such character and the valves being so operated that the valve system may be made at low cost and be readily and effectively maintained in proper operative tightness, the valve travel reduced to a minimum and balancing devices rendered unnecessary, limitation of rotative speed, noise in operation, and complication avoided, sharpness of cut-off attained, and the employment of gridiron valves rendered admissible without necessitating cylinder clearances of greater volume than would be required with valves controlling only a single port.

To this end my invention consists in certain novel devices and combinations hereinafter fully set forth.

The advantages of independent steam and exhaust valves in large stationary engines have been so fully recognized in approved practice that their employment may be said to have now become practically standard. The reduction of valve travel by the wrist motion of Corliss and the substantial absence of unbalanced valve-surfaces in the Corliss system are desirable and advantageous features, but the releasing-gear by which these valves are operated necessarily limits the rotative speed of engines in which they are employed and involves structural complication and noise and wear in operation. Moreover, the inconstant travel of valves controlled by releasing-gear causes unequal wear in such way as to permit serious leakage under certain conditions of change of load, and therefore of point of cut-off. This objection is familiar to builders and users of engines having valve-gear of the type referred to. Flat valves being easier to make and keep tight are for such reason desirable, but as ordinarily heretofore employed have been objectionable on account of involving unduly long travel and unbalanced pressure when controlling a single port, or increase of cylinder clearance when of gridiron form. Riding cut-off valves of the "Buckeye" type have been found to effect as sharp a cut-off as can be desired, but are subject to the objection that the inclosing main valve becomes large and unwieldy in engines of large size and tends to bulge out of shape by the pressure of the contained steam, particularly when it is high, as is ordinarily the case in present practice.

My invention is designed to attain, as far as may be, the advantages above noted without being subject to the attendant objections which have heretofore obtained, and to embody, particularly in engines of large size, the features of strength, compactness, freedom from complication and from high cost of construction and maintenance, and the capability of accurate distribution and economical utilization of steam.

Figure 2:
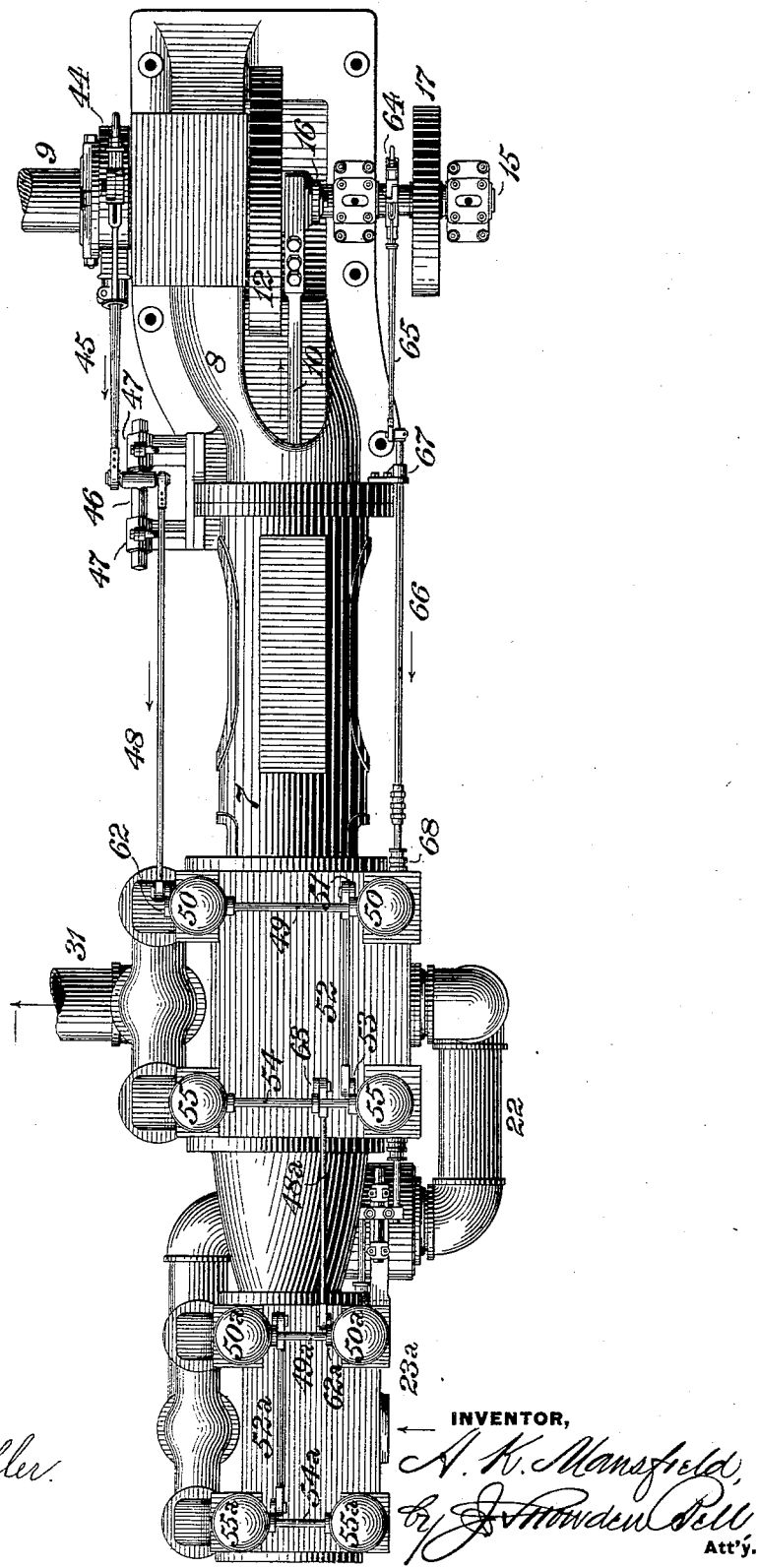
Figure 3:
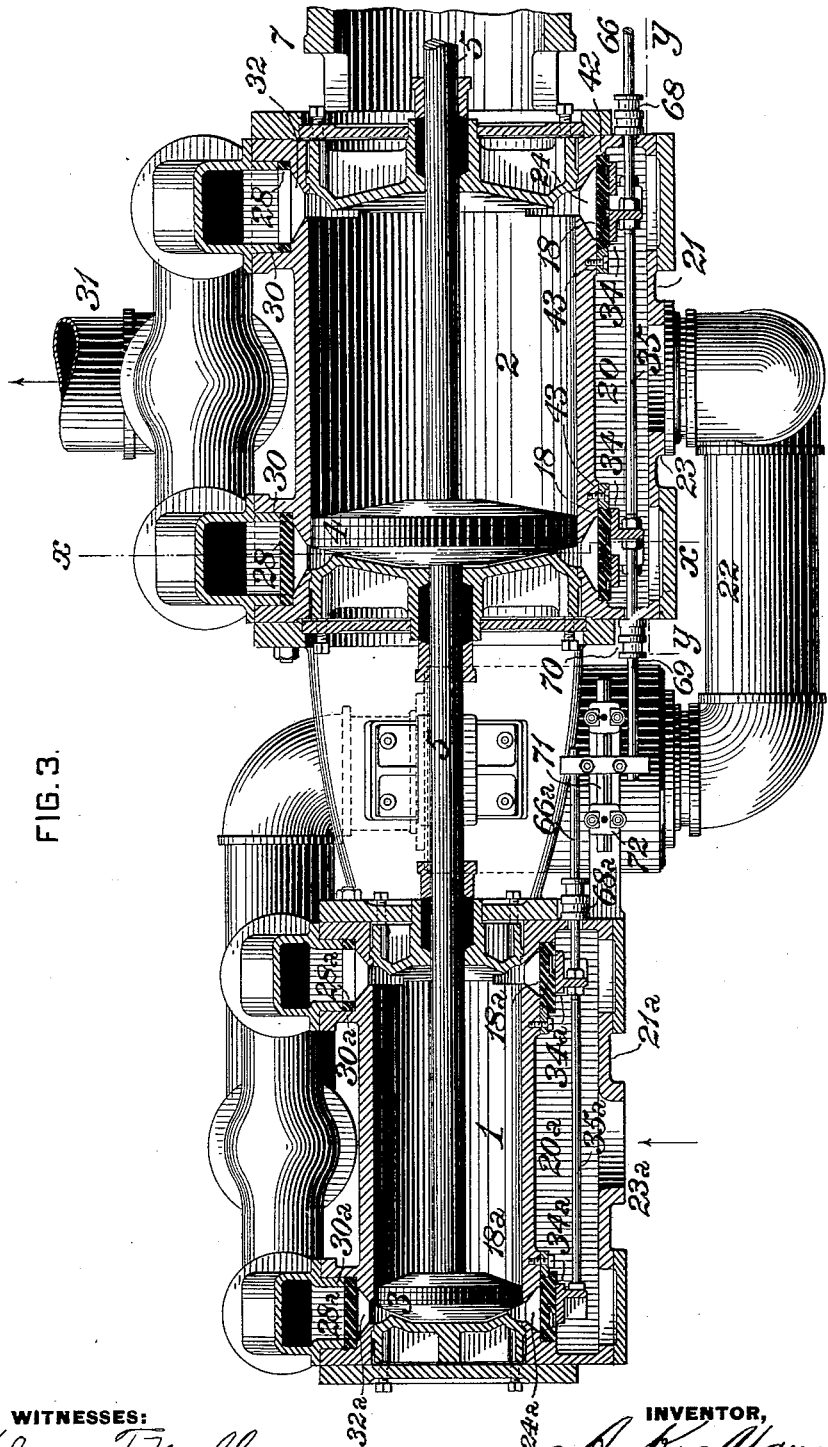

In the accompanying drawings, Figure 1 is a side view in elevation of a horizontal engine of the tandem compound type, illustrating an application of my invention; Fig. 2, a plan or top view of the same; Fig. 3, a horizontal longitudinal central section, on an enlarged scale, through the cylinders and valve-chests; Fig. 4, a transverse section through the low-pressure cylinder at the line $x\,x$ of Fig. 3; Fig. 5, a vertical longitudinal section through the steam-valve chest of the low-pressure cylinder at the line $y\,y$ of Fig. 3; Fig. 6, a view of a portion of one of the steam-valve faces of the low-pressure cylinder and its ports; Fig. 7, a view of one of the steam-supply ports of the low-pressure cylinder as seen from the inside of the cylinder; Fig. 8, a face view of a portion of one of the steam-valves of the low-pressure cylinder; Fig. 9, a back view of the same; Fig. 10, a transverse section through one of the steam-valves of the high-pressure cylinder, taken through one of the ports thereof; Fig. 11, a similar section through one of the steam-valves of the low-pressure cylinder; and Fig. 12, a vertical section, on a further-enlarged scale, through one of the cut-off-valve guides of the low-pressure cylinder.

My invention is herein illustrated and described as applied in an engine of the tandem compound type, but it will be obvious to those skilled in the art that it is not limited to such or any other type, and may, without variation of essential structural features or operative principle, be embodied in single-expansion engines with either one or two cylinders or in multiple-expansion engines having their cylinders set side and side, or on opposite sides of a common crank-shaft, various forms of which—horizontal, vertical, and inclined—are well known in practice.

Referring to the drawings, the engine is shown as a horizontal tandem compound having a high-pressure cylinder 1 and a low-pressure cylinder 2, which are secured in the ordinary manner to a suitable foundation, and provided, respectively, with pistons 3 and 4, which are preferably made mostly of sheet-steel and of conical form to attain stiffness and lightness, and are fixed upon a common piston-rod 5. The piston-rod is supported between the pistons in a tandem engine, as shown, or beyond the cylinder in a simple engine. A cross-head 6, secured to the piston-rod, is fitted to reciprocate in guides in a frame-section 7, connected at one end to the low-pressure cylinder and at the other to a bed-section 8, on which is formed or fixed the main bearing of the main or crank shaft 9. The cross-head 6 is coupled by a connecting-rod 10 to the pin 11 of a crank arm or disk 12 on the crank-shaft 9.

The steam-distribution functions of the high and low pressure cylinders are effected in each cylinder by two steam-valves, two exhaust-valves, and two cut-off valves, all of which, except the cut-off valves, are of the gridiron or multiported type, one valve of each description operating at each end of each of the cylinders. The steam and exhaust valves are actuated by a fixed eccentric 13 on the crank-shaft, and the cut-off valves are independently actuated by an adjustable eccentric 14, which for the purpose of enabling the main shaft to be shortened and thereby stiffened when this is desirable, as, for instance, when an electric generator is mounted directly on the main shaft, is in this instance shown as mounted on an independent shaft 15, rotated by a drag or return crank 16 on the main-crank pin 11. The cut-off eccentric 14 is varied and controlled in circumferential position by a "shaft-governor" 17, which may be of any suitable and preferred construction and is shown as mounted on the independent shaft 15. The main and cut-off eccentrics 13 and 14 are indicated by dotted circles in Fig. 1 for the reason that, being covered by their straps, they are not visible in Fig. 2. The cut-off eccentric 14 may, if preferred, be mounted on the crank-shaft directly instead of on an independent shaft, as shown, and it will be obvious that the fixed eccentric 13 may, where such location is for any purpose desirable, be secured upon a counter-shaft driven by the crank-shaft. The valves and ports of the two cylinders being substantially similar, and those of the low-pressure cylinder being the larger and therefore the better adapted for illustration and description, these latter only need be in detail set forth. It will be understood that, except as otherwise stated, their description is equally applicable to the corresponding members in the high-pressure cylinder.

The steam-valves 18 18 of the low-pressure cylinder are fitted to reciprocate vertically on and control series of ports in valve-faces 19 19 on one side and at each end of the cylinder, within a valve-chest 20, which is closed by a cover or bonnet 21 and is supplied with steam (which in the engine shown is exhausted from the high-pressure cylinder) through a pipe 22, connected to a nozzle or flanged opening 23 on the cover 21 of the chest. A series of cylinder supply-ports 24 25, the form of which will be presently described, extends through the metal of the cylinder on which the valve-face 19 at each end thereof is formed, and a substantially similar series of valve-ports 26 27 is formed in each of the steam-valves 18. In order to enable a series of gridiron ports to be employed in the cylinder and valves without involving a greater volume of cylinder clearance than would be required if a single port at each end of the cylinder was used, the cylinder and valve-ports are made in the following form:

A series of long and narrow horizontal ports or face-openings 24, disposed vertically one above another, is cored in the wall of the cylinder on which each of the valve-faces thereof is formed, these ports opening on the valve-faces 19 and running or merging into a single vertical long and narrow port 25, which opens on the inside of the cylinder-wall, as most clearly shown in Figs. 4, 6, and 7. The resultant distribution of the metal or bridges between the ports from the face to the inside of the cylinder-wall is such that the total transverse area of port-opening or passage-way for steam is constant from the valve-face to the opposite or inner face of the cylinder, the cylinder clearance thus being not in excess of that which would be necessary with a single port. The ports 26 27 of the steam-valves are correspondingly formed, but in the low-pressure cylinder differ structurally, although not in operative principle, in the particular that the long and narrow port-openings 26, which are disposed vertically one above another on the face of the valve in correspondence with the valve-face openings 24 of the cylinder, run or merge into two long and narrow vertical ports 27 27 on the back of the valve, each of which is one-half the width of the cylinder port-opening 25.

The exhaust-valves 28 28 of the low-pressure cylinder, which are provided with a series of long and narrow horizontal ports 33, reciprocate vertically on and control series of ports in valve-faces 29 29 on the opposite side and at each end of the cylinder within valve-chests 30 30, communicating with a common exhaust-pipe 31, leading to a condenser or to the atmosphere, as the case may be. The cylinder exhaust-ports 32 correspond in form with the steam-ports above described, but there being no reduction of clearance necessary exterior to the exhaust-valve faces 29 the ports 33 of the exhaust-valves may be rectangular ports extending directly through the valves, as in ordinary practice.

The cutting off of steam at proper and desired points in the stroke of the high-pressure piston 4 is effected by two connected cut-off or expansion valves 34 34, one for each end of the cylinder, which operate together as one valve and are reciprocated longitudinally or at right angles to the traverse of the steam-valves 18 on the backs of said valves and control the vertical ports 27 thereof in the ordinary manner of riding cut-off valves. The two cut-off valves 34 are connected one to the other by rods 35 35 and are preferably provided with tongues or projections 36 36, which are fitted to slide between guides 37 37 on the steam-valve-chest cover 21. The proper fit of the tongues between the guides may, as more clearly shown in Fig. 12, be maintained by liners 38 38, adjusted by set-screws 39 39, and bearing for the valves on the valve-chest cover is provided by blocks 40 40, which bear against the cut-off valves through springs 41.

The steam-valves $18^a$, exhaust-valves $28^a$, cut-off valves $34^a$, and steam and exhaust ports $24^a$ and $32^a$ of the high-pressure cylinder 1 are substantially similar in construction, operation, and relation one to another and to the cylinder to the corresponding members of the low-pressure cylinder above described. Steam from the boiler is admitted to the high-pressure steam-valve chest $20^a$ through a steam-supply pipe connected to a nozzle or flanged opening $23^a$ on the cover $21^a$ of the steam-valve chest, and is exhausted from the exhaust-valve chests $30^a$ to the low-pressure steam-valve chest 20 through the pipe 22. The steam-valves of each of the cylinders are preferably formed with an inclined side, as shown, and are guided in their vertical movements between shoulders or guide-faces 42 on the valve-faces and opposite removable guide-bars 43, against which the inclined sides of the valves fit. The steam-valves $18^a$ of the high-pressure cylinder differ from those of the low-pressure cylinder in having only one vertical port $27^a$, those of the low-pressure cylinders each having, as before stated, two of said vertical and longitudinal ports.

The straps 44 of the fixed eccentric 13, by which the steam and exhaust valves of both cylinders are coincidently actuated, is coupled by an eccentric-rod 45 to a bar 46, fitted to reciprocate in fixed guides 47 on the frame or bed-plate of the engine. The bar 46 is in turn coupled by a rod or link 48 to an arm 62 on a horizontal rock-shaft 49, journaled transversely to the low-pressure cylinder 2 in or about in the central plane of the ports thereof nearest the crank-shaft in bearings formed in covered stands 50, fixed to the tops of the adjacent exhaust-valve chest and of the steam-valve chest. An arm 51 on the rock-shaft 49 is coupled by a rod or link 52 to a similar arm 53 on a horizontal rock-shaft 54, journaled parallel with the rock-shaft 49 in the central plane of the ports at the opposite end of the cylinder in bearings formed in similar covered stands 55. Cranks 56 57 are formed on each of the rock-shafts 49 and 54, and their crank-pins are coupled by links 58 59, respectively, to the stems 60 of the steam-valves and the stems 61 of the exhaust-valves.

It will be seen that the vibratory movements imparted to the coupled rock-shafts 49 and 54 by the eccentric 13 effect the coincident reciprocation of the steam and exhaust valves over their respective faces, and also that the cranks 56 and 57 may be and are so proportioned and placed that they produce the well-known effect of the valve motion derived from the Corliss "wrist-plate," the construction and operation of which are familiar to those skilled in steam-engine practice.

The mechanism for connecting and actuating the steam and exhaust valves of the high-pressure cylinder 1 coincidently with those of the low-pressure cylinder, being similar in all particulars to that of the low-pressure cylinder, need not be described further than as to its connection with the latter, which is effected by means of a rod or link $48^a$ coupled at one end to an arm 63 on the rock-shaft 54, which is nearest the high-pressure cylinder, and at the other end to an arm $62^a$ on the rock-shaft $49^a$ of the steam and exhaust valves at the adjacent end of the high-pressure cylinder.

Reciprocating movement at right angles to the traverse of the steam-valves of the high and low pressure cylinders is imparted to the cut-off valves 34 $34^a$ of said cylinders by the adjustable eccentric 14, which, as before stated, is controlled by the governor 17. The strap 64 of the cut-off eccentric 14 is coupled by the eccentric-rod 65 to a valve-stem 66, which passes through a guide 67 on the frame and a stuffing-box 68 in the low-pressure steam-valve chest 20 and is connected to the cut-off valve 34 at the adjacent end of the low-pressure cylinder. The two low-pressure cut-off valves 34 34 are connected by rods 35 35, and the cut-off valve nearest the high-pressure cylinder is connected to the adjacent cut-off valve $34^a$ of said cylinder by a rod 69, passing through a stuffing-box 70 in the low-pressure steam-valve chest and fixed to a bar 71, sliding in fixed guides 72, said bar being in turn connected to a valve-stem $66^a$, which passes through a stuffing-box $68^a$ in the high-pressure steam-valve chest and is connected to the adjacent cut-off valve $34^a$ of the high-pressure cylinder. The high-pressure cut-off valves 34ª 34ª are connected, one to the other, similarly to those of the low-pressure cylinder, that is to say, by one or more rods 35ª.

It will be seen that by the employment of cut-off valves traversing at right angles to the movement of the steam-admission valves the result attained directly at the valves is equivalent to that produced by the compound rocker-arm in the Buckeye construction. The travel of all the valves is short, and being constant on their respective seats the advantage of uniform wear is attained. All the wearing surfaces of the valves and the faces on which they work being flat, these surfaces are easily scraped to fit and tend to maintain in service their original shape.

I claim as my invention and desire to secure by Letters Patent—

1. The combination, substantially as set forth, of a steam-cylinder, a piston and rod fitted to reciprocate therein, a crank-shaft connected with said piston-rod, two multi-ported steam-valves and two multiported exhaust-valves, each controlling a series of ports adjacent to one end of the cylinder, mechanism for coincidently reciprocating said steam and exhaust valves, two cut-off valves, each controlling a port in one of the steam-valves, and mechanism operated from the crank-shaft for reciprocating said cut-off valves at right angles to the traverse of the steam-valves.

2. The combination, substantially as set forth, of a steam-cylinder, a piston and rod fitted to reciprocate therein, a crank-shaft connected with said piston-rod, two multi-ported steam-valves and two multiported exhaust-valves, each controlling a series of ports adjacent to one end of the cylinder, an eccentric fixed on the crank-shaft or on a shaft rotated thereby, connections for coincidently reciprocating the steam and exhaust valves from said fixed eccentric, two cut-off valves, each controlling a port in one of the steam-valves, an adjustable eccentric rotated by the crank-shaft, and connections through which the cut-off valves are reciprocated, by said adjustable eccentric, at right angles to the traverse of the steam-valves.

3. The combination, substantially as set forth, of a steam-cylinder, a piston and rod fitted to reciprocate therein, a crank-shaft connected with said piston-rod, two multi-ported steam-valves and two multiported exhaust-valves, each controlling a series of ports adjacent to one end of the cylinder, an eccentric fixed on the crank-shaft or on a shaft rotated thereby, connections for coincidently reciprocating the steam and exhaust valves from said fixed eccentric, two cut-off valves, each controlling a port in one of the steam-valves, an adjustable eccentric rotated by the crank-shaft, a governor varying and controlling the position of said eccentric, and connections through which the cut-off valves are reciprocated, by said adjustable eccentric, at right angles to the traverse of the steam-valves.

4. The combination, substantially as set forth, of a steam-cylinder, a piston and rod fitted to reciprocate therein, a crank-shaft connected with said piston-rod, two multi-ported steam-valves and two multiported exhaust-valves, each fitted to reciprocate transversely to the cylinder and controlling a series of ports adjacent to one end thereof, two rock-shafts, each journaled transversely on the cylinder substantially in the central plane of the valves at one end thereof, links coupling crank-arms on each of said shafts with the adjacent steam and exhaust valves, an eccentric fixed on the crank-shaft or on a shaft rotated thereby, a link connecting the strap of said eccentric with an arm on one of the rock-shafts, a link connecting an arm on said rock-shaft with an arm on the rock-shaft at the opposite end of the cylinder, two cut-off valves each controlling a port in one of the steam-valves, an adjustable eccentric rotated by the crank-shaft, and stems connecting said cut-off valves one with the other and with the strap of the adjustable eccentric.

5. The combination, substantially as set forth, of a steam-cylinder, a piston fitted to reciprocate therein, a crank-shaft connected with said piston, valve-faces formed on said cylinder near its ends, each having a series of ports, the openings of which, on the valve-face, are longitudinal to the cylinder and are separated by bridges of metal, and which merge, by inclined sides, into one or more openings on the opposite side of the cylinder-wall which are transverse to the cylinder, multiported or gridiron slide-valves controlling said cylinder-ports, and mechanism for reciprocating said slide-valves transversely to the cylinder.

6. The combination, substantially as set forth, of a steam-cylinder, a piston fitted to reciprocate therein, a crank-shaft connected with said piston, valve-faces formed on said cylinder near its ends, each having a series of ports, the openings of which, on the valve-face, are longitudinal to the cylinder and are separated by bridges of metal, and which merge, by inclined sides, into one or more openings on the opposite side of the cylinder-wall which are transverse to the cylinder, multiported or gridiron slide-valves, each controlling one of said series of cylinder-ports and having a series of ports, the openings of which, on the face of the valve, are longitudinal to the cylinder and are separated by bridges of metal, and which merge, by inclined sides, into one or more openings on the back of the valve which are transverse to the cylinder, and mechanism for reciprocating said slide-valves transversely to the cylinder.

7. The combination, substantially as set forth, of a steam-cylinder, a piston fitted to reciprocate therein, a crank-shaft connected with said piston, valve-faces formed on said cylinder near its ends, each having a series of ports, the openings of which, on the valve-face, are longitudinal to the cylinder and are separated by bridges of metal, and which merge, by inclined sides, into one or more openings on the opposite side of the cylinder-wall which are transverse to the cylinder, multiported or gridiron main slide-valves controlling said cylinder-ports, cut-off valves fitted to reciprocate on and controlling the ports of said main valves, mechanism for reciprocating said main valves transversely to the cylinder, and mechanism for reciprocating said cut-off valves at right angles to the traverse of the main valves.

8. A multiported or gridiron slide-valve for steam-engines, having a series of ports, the openings of which, on the face of the valve, are separated by bridges of metal, and which merge, by inclined sides, into one or more openings on the back of the valve, at right angles to the openings in its face.

9. The combination, substantially as set forth, of a steam-cylinder, which is multiported adjacent to one of its ends, a multiported or gridiron main slide-valve controlling the cylinder-ports and having a series of ports, the openings of which, on its face, are separated by bridges of metal, and which merge, by inclined sides, into one or more openings on its back at right angles to those on its face, a cut-off valve controlling the openings on the back of the main valve, and mechanism for reciprocating the main and cut-off valves in directions at right angles one to the other.

10. The combination, substantially as set forth, of a steam-cylinder, a piston fitted to reciprocate therein, a crank-shaft connected with said piston, multiported or gridiron slide-valves fitted to traverse over and control series of ports in valve-faces near each end of the cylinder, a fixed and a removable guide on each of said valve-faces, transverse to the cylinder and controlling rectilineal movement of a valve, and mechanism for reciprocating said valves transversely to the cylinder.

11. The combination, substantially as set forth, of a steam-cylinder, a piston fitted to reciprocate therein, a crank-shaft connected with said piston, multiported or gridiron main slide, valves fitted to traverse over and control series of ports in valve-faces near each end of the cylinder, a fixed and a removable guide on each of said valve-faces, transverse to the cylinder and controlling rectilineal movement of a main slide-valve, a valve-chest inclosing said valves, cut-off valves controlling the ports of the main valves, guides on the valve-chest cover controlling rectilineal movement of the cut-off valves, mechanism for reciprocating the main valves transversely to the cylinder, and mechanism for reciprocating the cut-off valves at right angles to the traverse of the main valves.

ALBERT K. MANSFIELD.

Witnesses:
   EDGE T. COPE,
   HERBERT BONSALL.

It is hereby certified that in Letters Patent No. 569,292, granted October 13, 1896, upon the application of Albert K. Mansfield, of Salem, Ohio, for an improvement in "Steam-Engines," errors appear in the printed specification requiring correction, as follows: In line 4, page 1, the article *a* should be inserted after the word "invented," lines 5 and 6 the word "improvements" should read *improvement*, and line 61, page 3, the word "straps" should read *strap;* and that the said Letters Patent should be read with these corrections therein that the same may conform to the record of the case in the Patent Office.

Signed, countersigned, and sealed this 27th day of October, A. D. 1896.

[SEAL.]

JNO. M. REYNOLDS,
*Assistant Secretary of the Interior.*

Countersigned:
  JOHN S. SEYMOUR,
    *Commissioner of Patents.*